(12) United States Patent
Maiman et al.

(10) Patent No.: US 12,062,258 B2
(45) Date of Patent: Aug. 13, 2024

(54) USE OF A PAYMENT CARD TO UNLOCK A LOCK

(71) Applicant: Capital One Services, LLC, McLean, VA (US)

(72) Inventors: Tyler Maiman, Melville, NY (US); Negar Kalbasi, Washington, DC (US); Salik Shah, Washington, DC (US); Matthew Horton, Tulsa, OK (US); Abdelkader M'Hamed Benkreira, Washington, DC (US); Phoebe Atkins, Rockville, VA (US); Imren Johar, Clifton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/477,244

(22) Filed: Sep. 16, 2021

(65) Prior Publication Data
US 2023/0083785 A1  Mar. 16, 2023

(51) Int. Cl.
*G07C 9/22* (2020.01)
*G06Q 20/32* (2012.01)
(Continued)

(52) U.S. Cl.
CPC .......... *G07C 9/22* (2020.01); *G06Q 20/3223* (2013.01); *G06Q 20/3278* (2013.01);
(Continued)

(58) Field of Classification Search
CPC .. G07C 9/22; G07C 9/00309; G07C 9/00904; G07C 2009/00769
See application file for complete search history.

(56) References Cited

U.S. PATENT DOCUMENTS 4,683,553 A   7/1987  Mollier
4,827,113 A   5/1989  Rikuna
(Continued)

FOREIGN PATENT DOCUMENTS

CA   3010336 A1   7/2017
CN   101192295 A   6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Nabil H Syed
(74) *Attorney, Agent, or Firm* — KDW FIRM PLLC

(57) ABSTRACT

Exemplary embodiments may provide keys for unlocking access to a location, like a user room, a secure location, a door at an employee location, a trunk, a closet or other locked location or item, on a payment card. Examples of a payment card include but are not limited to a credit card, a debit card, a smart card, an employee identification card, etc. A secure token that acts as digital key may be uploaded to the payment card. The payment card may then be put in close proximity of a wireless reader at the lock. The wireless reader obtains the secure token and extracts the contents. If the contents are proper, the lock is unlocked. Otherwise, the lock remains locked.

17 Claims, 16 Drawing Sheets

(51) Int. Cl.
*G06Q 20/34* (2012.01)
*G07C 9/00* (2020.01)

(52) U.S. Cl.
CPC ........ *G06Q 20/352* (2013.01); *G07C 9/00309* (2013.01); *G07C 9/00904* (2013.01); *G06Q 2220/00* (2013.01); *G07C 2009/00769* (2013.01)

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,285,329 | B1 | 10/2012 | Zhu |
| 8,302,872 | B2 | 11/2012 | Mullen |

(56) References Cited

U.S. PATENT DOCUMENTS

| | | |
|---|---|---|
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B2 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,757,574 B1 * | 8/2020 | Rule .................. G06Q 20/3278 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |

(56) References Cited

U.S. PATENT DOCUMENTS

| | | |
|---|---|---|
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0169462 A1* | 7/2012 | Park ................. G07C 9/20 340/5.65 |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |

(56) References Cited

U.S. PATENT DOCUMENTS

| | | |
|---|---|---|
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0161978 A1* | 6/2017 | Wishne ............... G06Q 20/352 |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2022/0129894 A1* | 4/2022 | Phillips ............... G06Q 20/401 |

FOREIGN PATENT DOCUMENTS

| | | |
|---|---|---|
| CN | 103023643 A | 4/2013 |
| CN | 103417202 A | 12/2013 |
| CN | 109034758 A | 12/2018 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2020157823 A1 | 8/2020 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved

(56) References Cited

OTHER PUBLICATIONS from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://USA.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text- string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).

(56) References Cited

OTHER PUBLICATIONS

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
International Search Report and Written Opinion mailed Dec. 12, 2022, for PCT/US2022/043780 (14 pages).

* cited by examiner

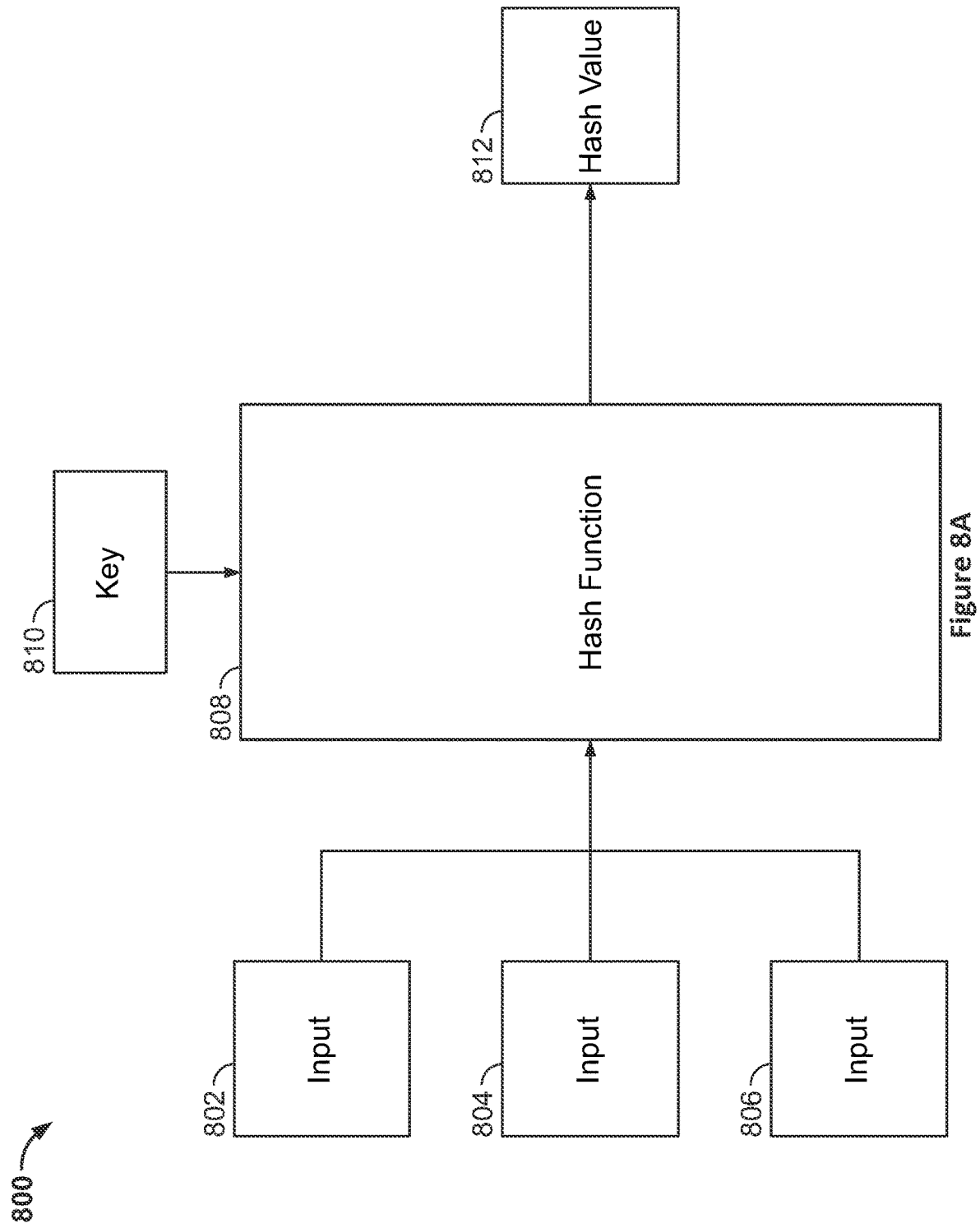

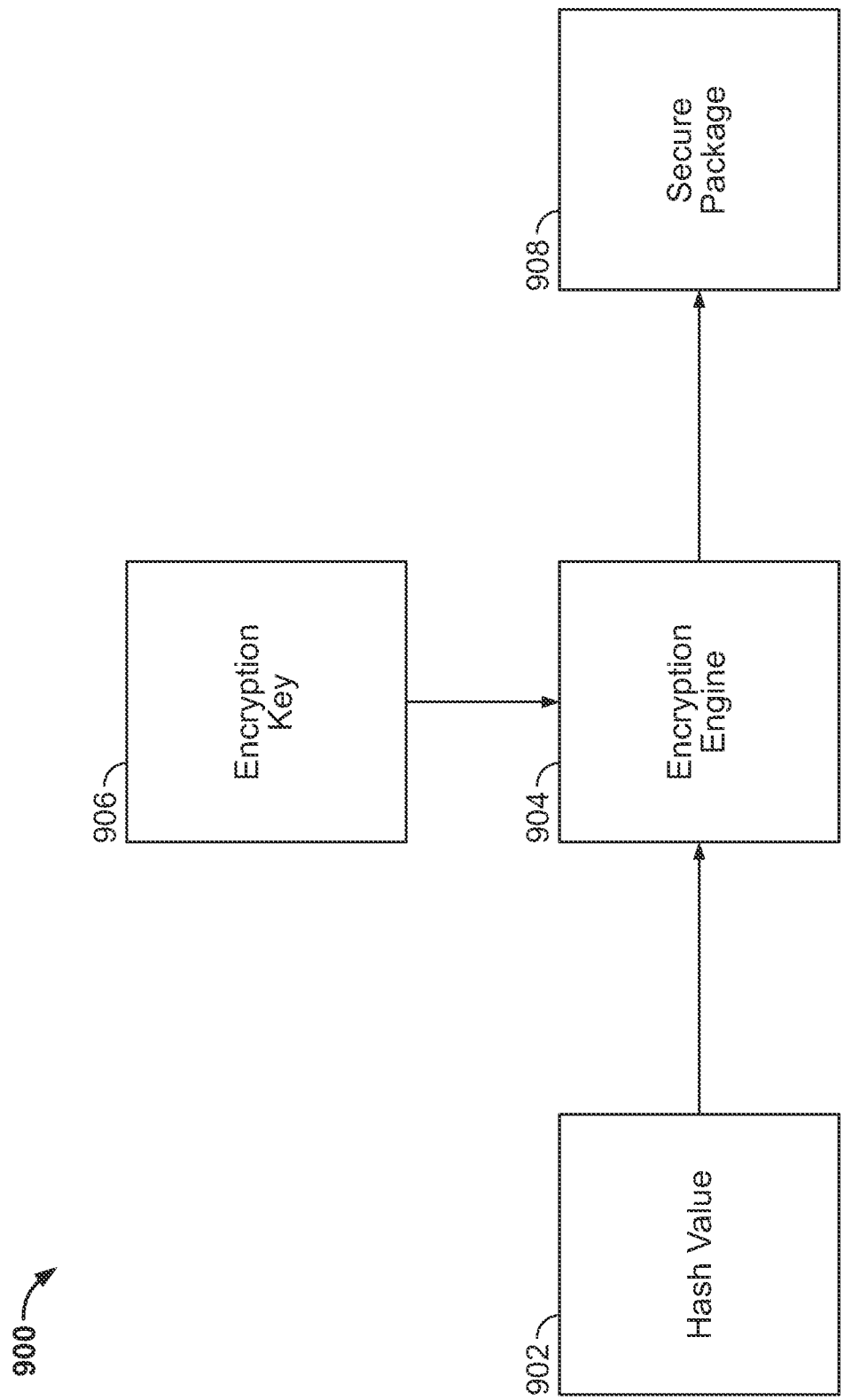

USE OF A PAYMENT CARD TO UNLOCK A LOCK

BACKGROUND

Lodging establishments, such as hotels, provide keys to their guests to access their rooms. The keys typically are either plastic key cards with magnetic strips or plastic key cards with Radio Frequency Identification (RFID) tags. With a plastic key card having a magnetic strip, a hotel clerk encodes information regarding the guest onto the magnetic strip of the card at the time of check in before handing the plastic key card to the guest. For instance, an identifier of the guest, a valid date/time, an expiration date/time and a room number may be encoded onto the magnetic strip. When the guest wishes to use the plastic key card, the guest runs an edge of the plastic key card having the magnetic strip through a magnetic card reader integrated into the door of the guest's room. The magnetic card reader reads information off of the magnetic strip and the information is analyzed by the lock. If the information is the correct information for unlocking the door, the lock to the door is unlocked so that the guest may access the room. If the information is not proper for unlocking the door, access is denied, and the door remains locked.

The plastic key card with an RFID chip operates somewhat differently. The hotel clerk encodes guest information in the RFID chip of the plastic key card at the time of check in before giving the guest the plastic key card. When the guest wishes to use the plastic key card, the guest places the plastic key card up against an RFID reader that is integrated into the door of a guest room. The RFID reader reads information wirelessly from the RFID chip in the plastic key card. If the information is the correct information for unlocking the door, the lock to the door is unlocked so that the guest may access the room. If the information is not proper to unlock the door, access is denied, and the door remains locked.

Such plastic key cards may also be used for other purposes. For example, employers may give employees such plastic key cards to gain access to the employer premises or to gain access to secure areas. For example, a secure laboratory in a corporation may require key card access. The plastic key cards may be used to access other locations where a lock is deemed necessary. Such plastic key card may even be used with locked items, such as trunks, safes, etc.

There are drawbacks to use of these varieties of plastic key cards. For example, these varieties of plastic key cards are not especially secure. Information on the magnetic strips or RFID tags is readily accessible to a party with a magnetic card reader or RFID reader. In addition, such plastic key cards are easily misplaced. As a result, the plastic key cards may end up in the hands of the wrong parties or the user may lose access to the locked location or item until a new card is obtained. Further, it is inconvenient for the user to have to keep track of an additional card. Lastly, it is expensive for lodging owners to have to purchase plastic key cards, especially given that many are lost or destroyed.

SUMMARY

In accordance with an inventive aspect, a method includes receiving identity information and credentials originating from a contactless card via a wireless communication protocol. Based on the identity information and the credentials, an identity of a party is confirmed. After the identity confirmed, a code is forwarded for a payment card. The code serves as a digital key to unlock a lock.

The payment card may be a smart card or a credit card with capabilities for the wireless communication protocol. The wireless communication protocol may be a Near Field Communication (NFC) protocol. The lock may be for a hotel room. The method may further include storing a room number for the code and storing the identity of the party onto the payment card. The method may also include receiving the code from a computing device. The identity information and credentials may be received in an encrypted package.

In accordance with another inventive aspect, a method includes receiving credentials and identity information for a party at a portable computing device from a contactless card via a wireless communication protocol. The credentials and the identity information are forwarded to an authentication authority. Confirmation of the identity of the party is received. After the confirmation of the identity of the party, a code is forwarded to a payment card via the wireless communication protocol. The code serves as a digital key to unlock a lock.

The portable computing device may be a smartphone, tablet computing device, a smartwatch or a wearable device. The wireless communication protocol may be a Near Field Communication (NFC) protocol. The lock may be for a hotel room. The identity information and credentials may be received in an encrypted package. The forwarding and the receiving confirmation may be via a networked connection. The networked connection may be a wireless network connection, a cellular network connection or a wired network connection.

In accordance with an additional inventive aspect, a smart card includes a memory for storing identity information regarding a user, a key code for unlocking a lock with the smart card, computer program instructions for unlocking the lock with the key code, and computer program instructions for performing wireless payments. The smart card also includes a processor for executing the computer program instructions for unlocking the lock and the computer program instructions for performing wireless payments that are stored in the memory. The smart card further includes hardware enabling the smart card to communicate wirelessly.

The hardware may enable Near Field Communication (NFC) wireless communications. The lock may be a lock for a door. The lock may be for a hotel room lock. The memory may further store computer program instructions for downloading the key code from a device. The device may be a smartphone.

BRIEF DESCRIPTION OF THE DRAWINGS

FIG. 8A shows a block diagram depicting how the cryptographic hash functions may be used in exemplary embodiments.

FIG. 9 shows a block diagram depicting an encryption of a secure package in accordance with exemplary embodiments.

DETAILED DESCRIPTION

Exemplary embodiments may provide keys for unlocking access to a location or item on a user's payment card. Examples of a payment card include but are not limited to a credit card, a debit card, a smart card, an employee identification card with payment capabilities. A secure token that acts as digital key may be uploaded to the payment card of the user. For example, where the key is for a lodging room, a guest may login to a website or access an application for the lodging and check in by providing personal information and payment information. The guest may, in some instances, then access a self-service terminal that encodes the payment card with a secure token that acts as a digital key. In other instances, the user may exploit the capabilities of a mobile computing device, such as a smartphone, tablet, smartwatch or a wearable device, to download the secure token using the application or website and then transfer the secure token to the payment card. The payment card may then be put in close proximity of a wireless reader at the lock. The wireless reader obtains the secure token and extracts the contents. If the contents are correct for unlocking the lock, the lock is unlocked. Otherwise, the lock remains locked.

Suitable wireless communications protocol for use in the exemplary embodiments are the Near Field Communication (NFC) protocols or other wireless communication protocols. Thus, the mobile computing device or terminal and the payment card may be NFC capable. Where the self-service terminal is used, the terminal may transfer the secure token to the payment card via NFC. Similarly, the mobile computing device may transfer the secure token to the payment card via NFC. The payment card also may transfer the secure token via NFC to the wireless reader at lock.

The exemplary embodiments have the benefit of not requiring an additional plastic card to access a locked location or item. This eliminates the need for the user to keep track of an additional plastic card. Likewise, this has the benefit of reducing the expense for issuers of the plastic key cards in that they no longer need to purchase as many plastic key cards since many users will opt to have the keys encoded to their payment cards. The digital key on the payment card used in the exemplary embodiments is less likely to be lost by users as people tend to keep close tabs on their payment cards, whereas users often do not pay close attention to their conventional plastic key cards since they can readily get a new plastic key card. The keys used in the exemplary embodiments are secure in that each secure token that acts as a digital key is encrypted and is not accessible without having the decryption key(s) that are needed to decrypt the secure package.

Figure 1:
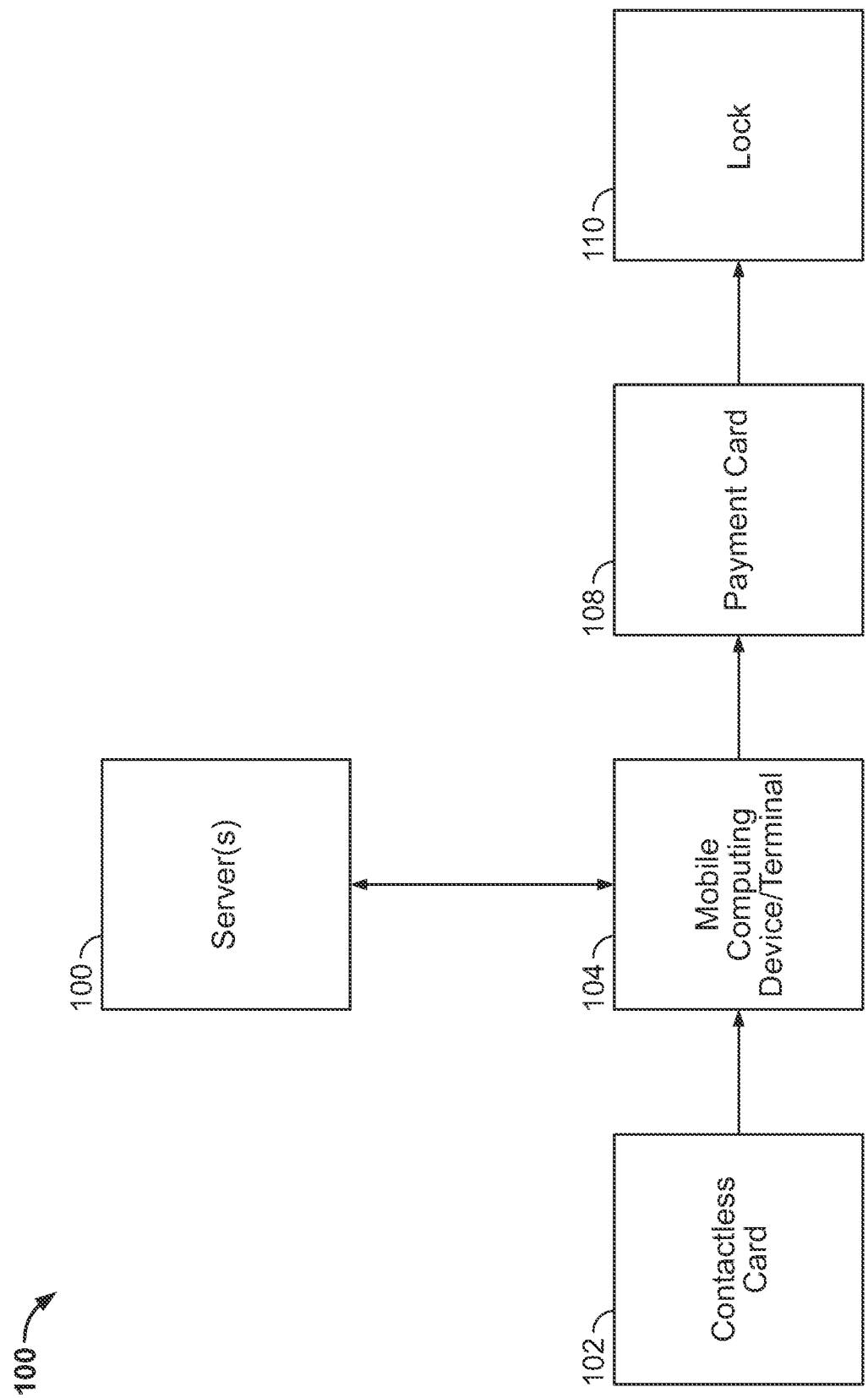
FIG. 1 depicts an example of an illustrative environment for exemplary embodiments.

FIG. 1 depicts an example of an illustrative environment 100 for exemplary embodiments. The illustrative environment 100 includes a contactless card 102. The contactless card 102 may support the NFC protocols and communicate with other devices via the NFC protocols. For instance, the contactless card 102 may wirelessly communicate with mobile computing device or terminal 104 when in close enough proximity (e.g., within 1.5 inches) with the mobile computing device or terminal 104. Details of an illustrative contactless card 102 are provided below. The mobile computing device 104 may be, for example, a smartphone, a tablet computing device, a smartwatch, a wearable computing device or other computing device that is mobile and that possesses the requisite functionality described herein. The terminal 104 may be an NFC capable terminal or computer system interfaced with the servers(s) 106. The mobile computing device/terminal 104 may be communicate with server(s) 106 via a network connection that may be wireless, wired or a combination therein. The server(s) 106 may be web servers, may be located on the cloud or may be accessible over a local area network (LAN), a wide area network (WAN), such as the Internet or via a combination thereof.

The mobile computing device/terminal 104 may communicate with a payment card 108 of the user. For example, as mentioned above, the mobile computing device/terminal 104 may provide the secure package that acts as a digital key to the payment card 108. The payment card 108 may interact with the lock 110 as will be described below to unlock the door.

Figure 2:
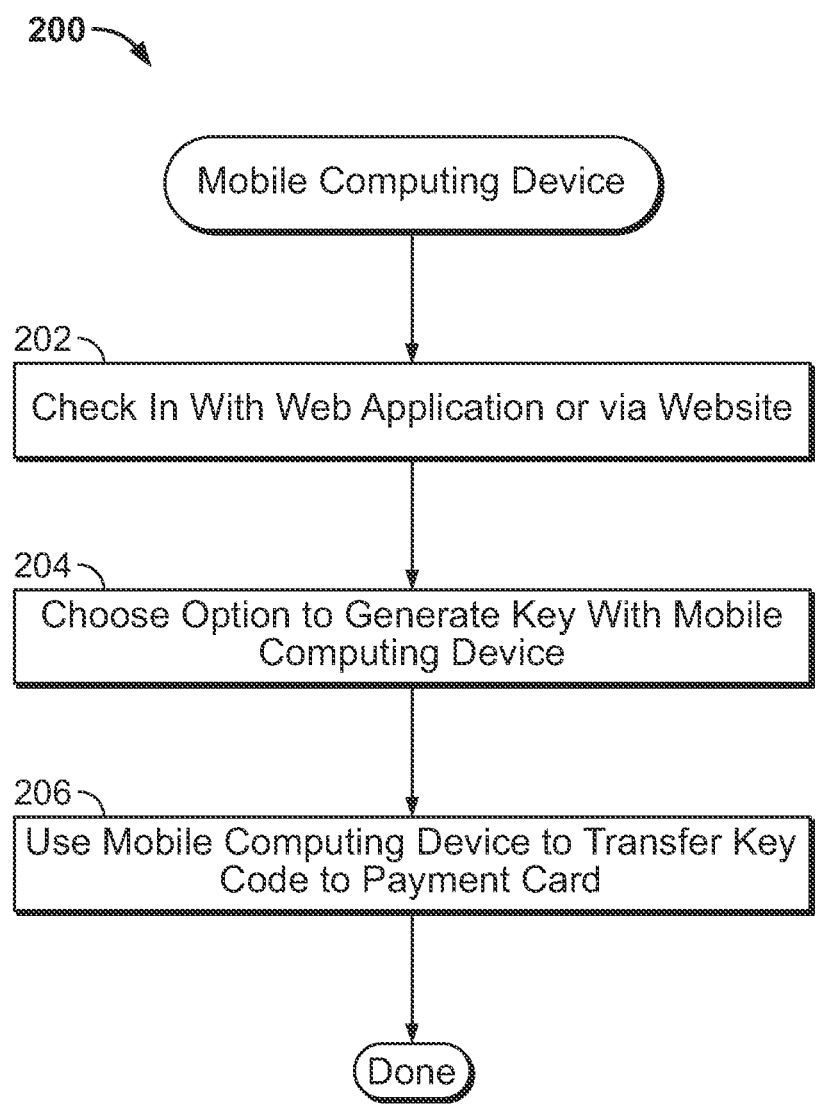
FIG. 2 depicts a flowchart of illustrative steps that may be performed to transfer a digital key to a payment card.

One use of the digital key on a payment card is to unlock a door of a lodging establishment, like a motel, hotel, inn or rental. There are at least two approaches that may be used in exemplary embodiments to get a digital key onto the payment card 108 for such a case where the user is to use the digital key on a payment card to unlock their lodging room or rental. In a first approach, the mobile computing device 104 transfers the digital key to the payment card 108. FIG. 2 depicts a flowchart of illustrative steps that may be performed to transfer the digital key to the payment card 108 from. Initially, the user may use the mobile computing device 104 to access an application for the lodging (such as an application for a hotel chain or rental agency) or access a website for the lodging to check in 202. The website may be running on the server(s) 106 or the application may be in communication with the server(s) 106. The user may be required to provide identity information, such as name, address and telephone number, and to provide payment information, such as credit card number, debit card number or the like, in order to check in. In some instances, the user may be prompted to tap the contactless card 102 to the mobile computing device 104 to authenticate identity, as described below. Once the guest has successfully checked in, the user may be prompted with the option to generate a digital key for storage on the payment card 108 (see 204). Where the user chooses the option to generate the digital key for storage on the payment card 108, the mobile computing device 104 transfers the secure token that acts as the digital key to the payment card 108 (see 206). As described below, the secure token may be downloaded from server(s) 106 to the mobile computing device 108 and then transferred to the payment card 108.

Figure 3:
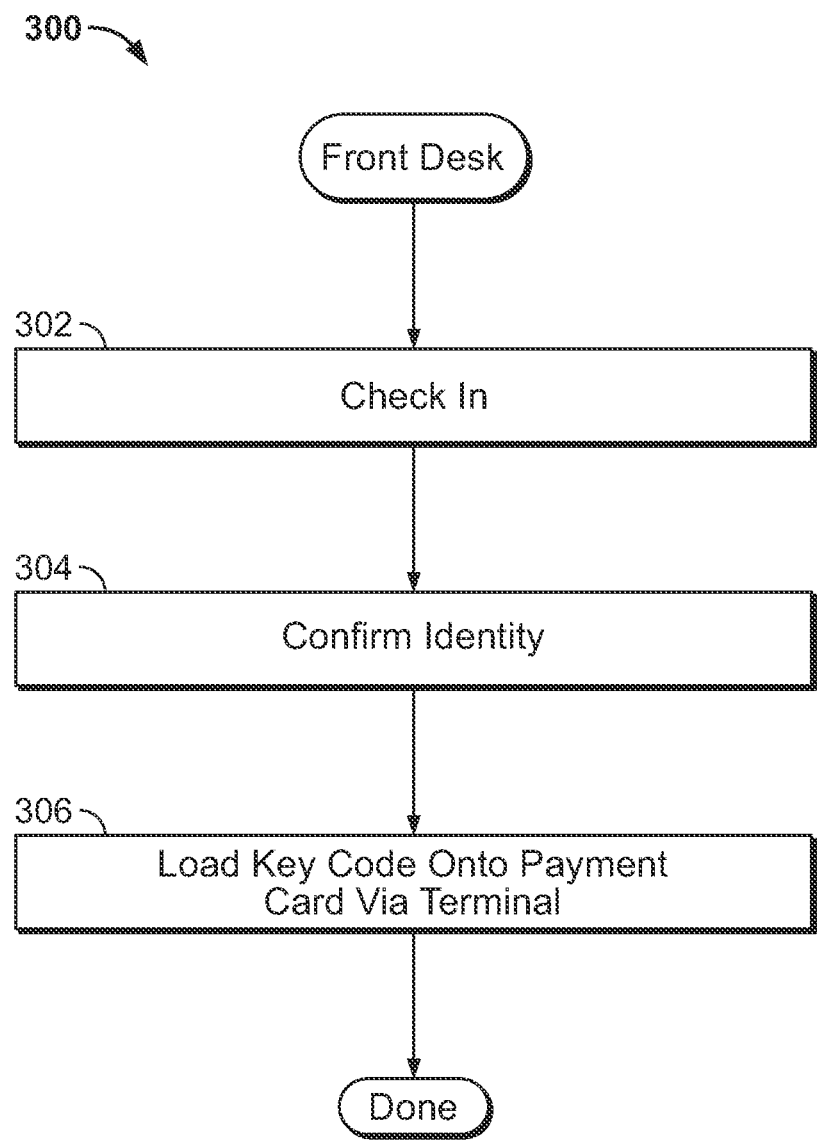
FIG. 3 depicts a flowchart of illustrative steps that may be performed in such exemplary embodiments.

Another alternative for the use in lodging is for the key to be downloaded from a self-service terminal at a lodging front desk or kiosk. FIG. 3 depicts a flowchart 300 of illustrative steps that may be performed in such exemplary embodiments. Initially, the user checks in, such as described above, using a website or application or by providing the needed personal and payment information to a clerk or kiosk (see 302). As part of the check in, the user may be required to confirm her/his identity (see 304). This may entail showing proper identification, providing personal information via the kiosk or using the contactless card 102 to confirm identity. Once the identity of the user is confirmed, the secure token that acts as a digital key may be uploaded to the payment card 108 via a terminal 104 (see 306). The terminal 104 may be, for instance, located at the front desk of the lodging establishment. In some exemplary embodiments, the terminal 104 is NFC capable and uses NFC to transfer the secure token to the payment card 108 of the user, which is also NFC capable.

Figure 4:
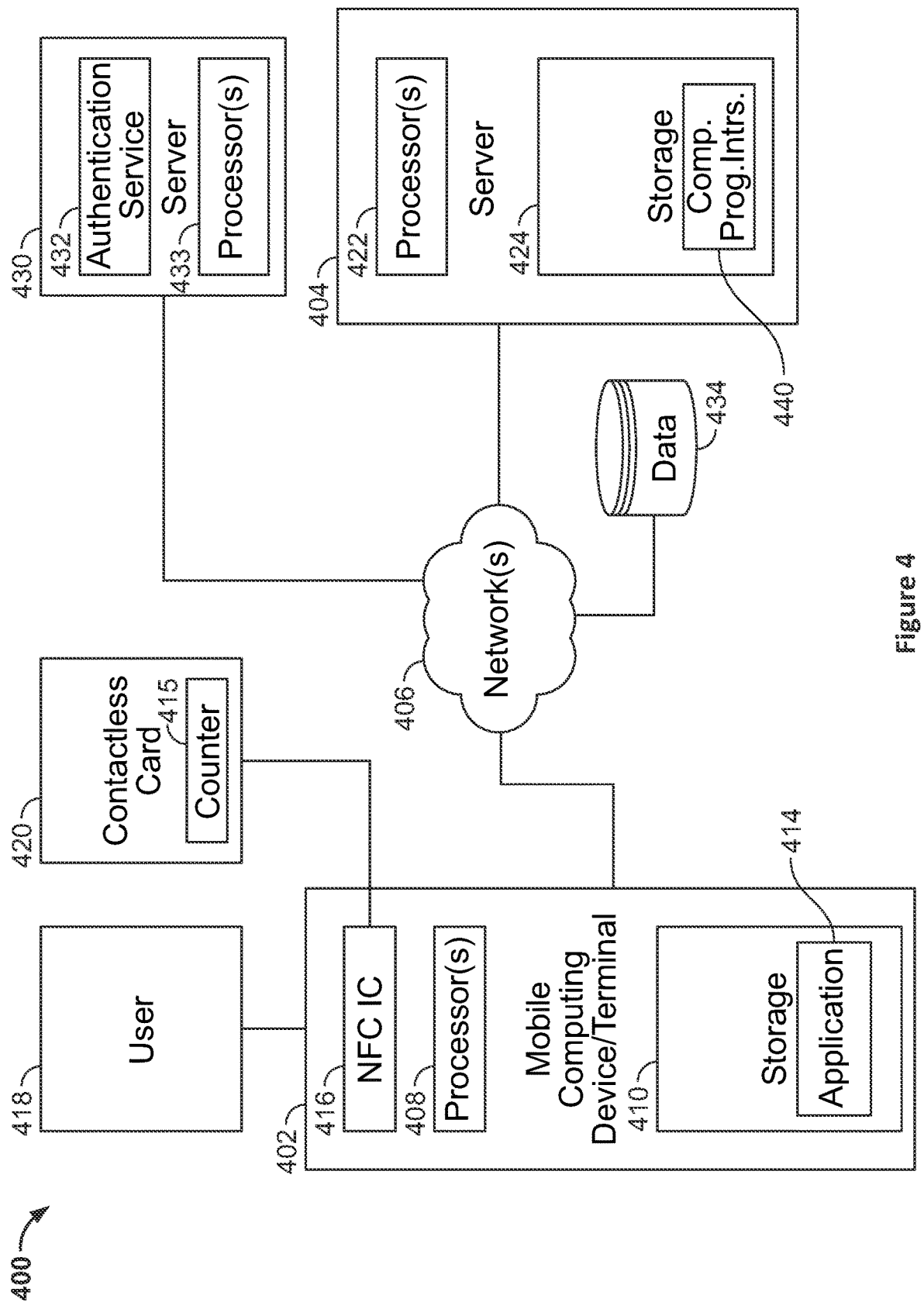
FIG. 4 depicts an illustrative computing environment that may be suitable for the exemplary embodiments.

FIG. 4 depicts an illustrative computing environment 400 in greater detail than FIG. 1 that may be suitable for the exemplary embodiments. The guest 418 has access to a mobile computing device/terminal 402. The mobile computing device/terminal 402 includes a processor 408, such as a Central Processing Unit (CPU), a Graphics Processing Unit (GPU), an Application Specific Integrated Circuit (ASIC), a Field Programmable Gate Array (FPGA) or other processing unit. The processor 408 may execute instructions, such as found in computer programs, like application 414, to perform functionality described herein. The mobile computing device/terminal 402 may include storage 410 that may include Random Access Memory (RAM), Read Only Memory (ROM), solid state memory, optical disk storage, magnetic disk storage or other varieties of memory or storage for storing data and/instructions. The storage 410 may include non-transitory computer-readable storage media hold processor executable instructions. The storage 410 may store an application 414. The application 414 may provide functionality as described herein for checking in and transferring the secure token to the payment card 108. The application 414 may also enable use of the contactless card 102 to authenticate identity of the user 418. The application 414 may be a web browser in some exemplary embodiments.

The mobile computing device/terminal 402 may include an integrated circuit (IC) for providing NFC capabilities 416. The NFC IC 416 may include an NFC transceiver and a loop antenna for participating in NFC communications. A contactless card 420 may communicate with the mobile computing device/terminal 402 via NFC, such as when the contactless card is tapped against the mobile computing device/terminal 402. The contactless card 420 may include a counter 415 that is used in secure communications. A payment card 403 may wirelessly communicate with the mobile computing device/terminal via NFC or another wireless protocol.

The mobile computing device/terminal 402 may communicate with server 404 and/or server 430. In some exemplary embodiments, the mobile computing device/terminal 403 communicates directly with only server 430. These servers 404 and 430 may be connected via network(s) 406 with the mobile computing device/terminal 402. The networks(s) 406 may include wide area networks, like the Internet and/or a cellular phone network, as well as local area networks, such as corporate networks, Ethernet networks, WiFi networks, etc or intranets. Server 404 may include one or more processors 422. The processor(s) 422 may assume the many forms like those described for the processor(s) 408. The server 404 may include a storage 424, that may include the forms of storage or memory described above for storage 410 of the mobile computing device/terminal 402. The storage 424 may store computer programming instructions 440. In some exemplary embodiments, these computer programming instructions 440 are for a website that may be accessed by the user 418 to check into lodging and obtain a digital key as described above. The computer programming instructions may also be server code the interacts with the application 414 to facilitate check in and obtaining of the digital key. The server 430 may be used when authentication of the identity of the user is required and may be invoked by server 404 to provide identity authentication. The server may include processor(s) 433 that execute an authentication service 432 for authenticating a user's identity. Servers 404 and 430 may have access to data 434, such as databases and the like.

Figure 5:
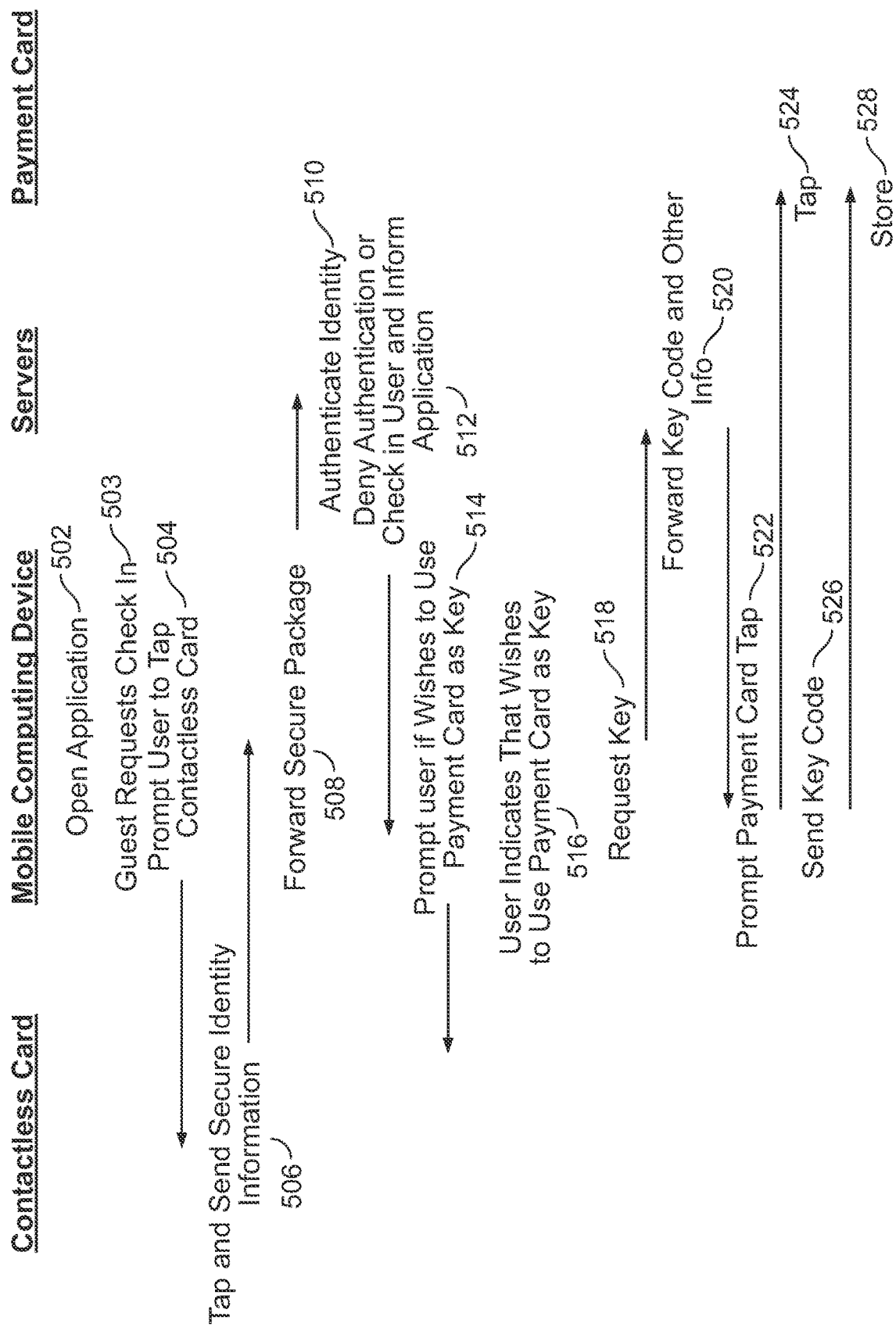
FIG. 5 depicts an illustration of the activities of the various components in performing such an interaction.

As was mentioned above, one option with using the payment card as a digital for a lodging room is for a user is to use a contactless card to prove identity and to transfer the digital key to the payment card via the mobile computing device. FIG. 5 depicts an illustration of the activities of the various components in performing such an interaction. FIG. 5 will be described with reference to the depiction of components in FIG. 4. Initially, the user 418 opens the application 414 on the mobile computing device 402 (see 502). The application may be an application for the lodging establishment or a web browser that enables access to a website for the lodging establishment. Using the application 414, the user 418 communicates with the program containing the computer program instructions 440 on the server 440 and requests check in (see 503). As part of the check in process, the application 414 prompts the user 418 to tap the contactless card 420 to the mobile computing device 402 (see 504). The contactless card 420 is tapped and sends identity information to the mobile computing device 402 in a secure package via NFC (see 506). The formation and content of the secure package from the contactless card 420 will be described in more detail below. The mobile computing device 402 sends the secure package containing the identity information to the server 404 (see 508). Server 430 may forward the secure package to the authentication service 432 on server 430. The authentication service 432 on the server 430 then authenticates the identity of the user (see 510). Once the user is authenticated, the user may be checked in, such as by server 404. In exemplary embodiments, the server 404 may ask the server 430 to perform the authentication of the identity of the user and inform the server 404 of the results. Where there is not a successful authentication, the denial may be sent to server 404 and forwarded back to the application 414 on the mobile computing device 402. Where the authentication is successful, the user is checked in and the successful check in is reported by server 404 to the application 414 on the mobile computing device 402 (see 512).

The application 414 on the mobile computing device 402 then may prompt the user to use the payment card as a key (see 514). The user may respond positively that the user wishes to use the payment card as a key (see 516). If user does not choose this option, the process halts. Otherwise, the application 414 may then request the key from server 404 (see 518). The computer program instructions 440 on the server generate the secure package that is the digital key. The key code and other information of the secure package may then be sent from the server 404 to the application 414 on the mobile computing device 402 (see 520). The application 414 prompts the user 418 to tap the payment card to the mobile computing device 402. The payment card is tapped to mobile computing device 403 (see 524). The secure package holding the digital key code may be transferred by the application 414 on the mobile computing device to the payment card via NFC as a result of the tap. In particular, the mobile computing device 402 sends the key code (see 526) and the key code is stored on the payment card (see 528).

Figure 6A:
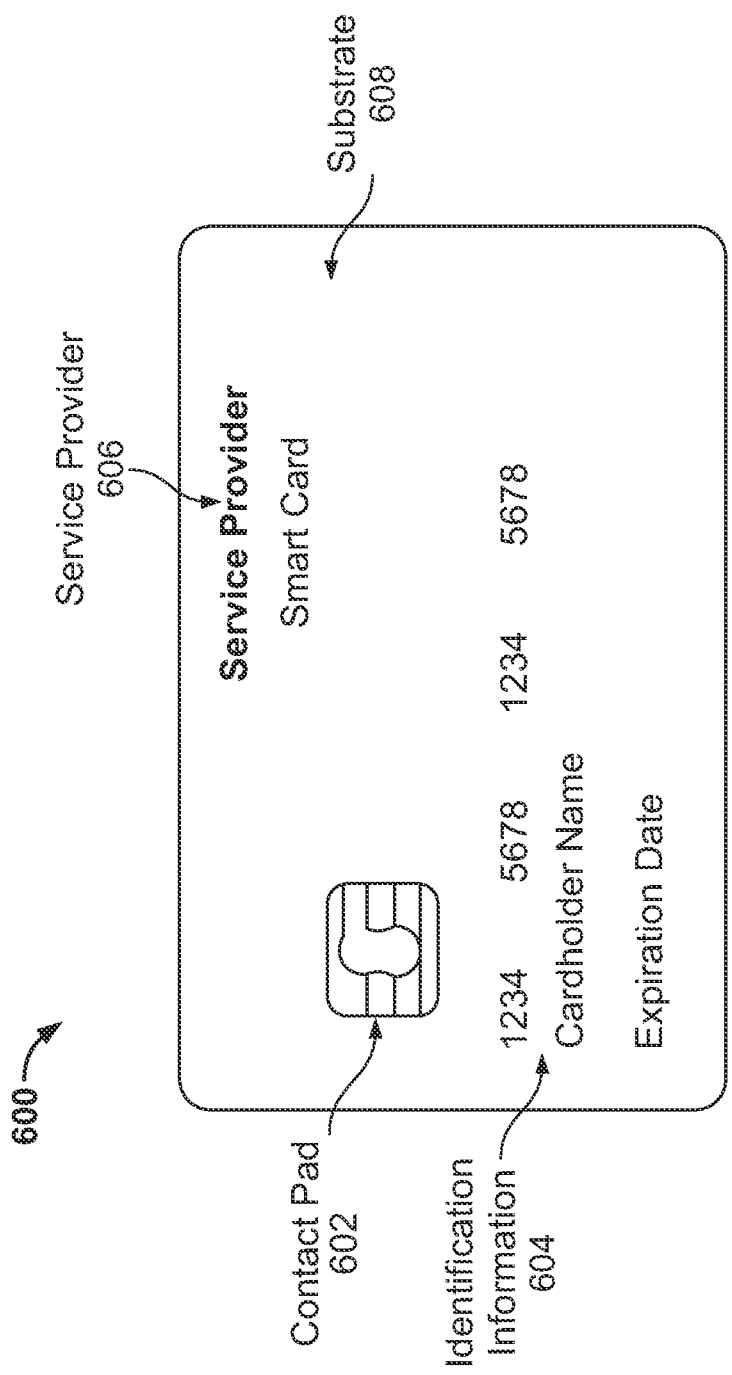
FIG. 6A depicts a front face of an illustrative contactless card suitable for exemplary embodiments.

The discussion will now focus on details of the use of the contactless card. FIG. 6A illustrates an example of the front of the contactless card 600, which may be issued by a service provider 606, such as a merchant, financial institution, etc. In some exemplary embodiments, the contactless card 600 may comprise an identification card. In some instances, the card 600 may comprise a dual interface contactless payment card. The contactless card 600 may comprise a substrate 608, which may include a single layer or laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 600 may have physical characteristics compliant with the ID-1 format of the ISO/IEC 7810 standard, and the contactless card 600 may otherwise be compliant with the ISO/IEC 14443 standard. However, it is understood that the contactless card 600 according to the present disclosure may have different characteristics.

The contactless card 600 may also include identification information 604 displayed on the front and/or back of the card, and a contact pad 602. The contact pad 602 may be configured to establish contact with another communication device, such as a user device, smart phone, laptop, desktop, or tablet computer. The contactless card 600 may also include processing circuitry, antenna and other components not shown in FIG. 6A. These components may be located behind the contact pad 602 or elsewhere on the substrate 608. The contactless card 600 may also include a magnetic strip or tape, which may be located on the back of the card (not shown in FIG. 6A).

Figure 6B:
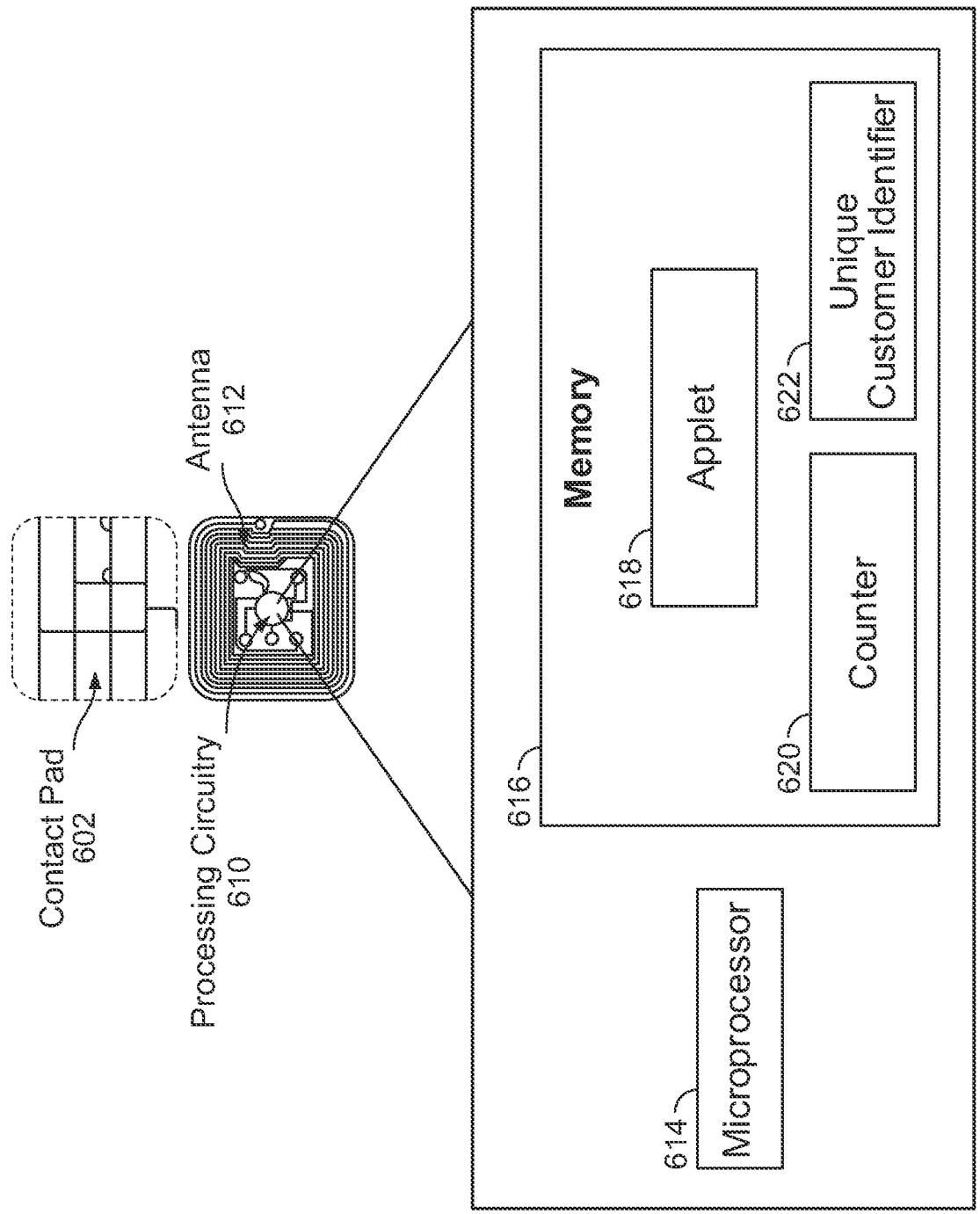
FIG. 6B illustrates components of the contactless card of FIG. 6A.

As illustrated in FIG. 6B, the contact pad 602 of FIG. 5A may include processing circuitry 610 for storing and processing information, including a microprocessor 614 and a memory 616. It is understood that the processing circuitry 610 may contain additional components, including processors, memories, error and parity/CRC checkers, data encoders, anti-collision algorithms, controllers, command decoders, security primitives and tamper proofing hardware, as necessary to perform the functions described herein.

The memory 616 may be a read-only memory, write-once read-multiple memory or read/write memory, e.g., RAM, ROM, and EEPROM, and the contactless card 600 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 616 may be configured to store one or more applets 618, one or more counters 620, and a unique customer identifier 622. The one or more applets 618 may comprise one or more software applications configured to execute on one or more contactless cards, such as Java Card applet. However, it is understood that applets 618 are not limited to Java Card applets, and instead may be any software application operable on contactless cards or other devices having limited memory. The one or more counters 620 may comprise a numeric counter sufficient to store an integer. The customer identifier 622 may comprise a unique alphanumeric identifier assigned to a user of the contactless card 600, and the identifier may distinguish the user of the contactless card from other contactless card users. In some examples, the customer identifier 622 may identify both a customer and an account assigned to that customer and may further identify the contactless card associated with the customer's account.

In some examples, the contactless card 600 may comprise one or more antennas 612. The one or more antennas 612 may be placed within the contactless card 600 and around the processing circuitry 610 of the contact pad 602. For example, the one or more antennas 612 may be integral with the processing circuitry 610 and the one or more antennas 612 may be used with an external booster coil. As another example, the one or more antennas 612 may be external to the contact pad 602 and the processing circuitry 610.

In an embodiment, the coil of contactless card 600 may act as the secondary of an air core transformer. The terminal may communicate with the contactless card 600 by cutting power or amplitude modulation. The contactless card 600 may infer the data transmitted from the terminal using the gaps in the contactless card's power connection, which may be functionally maintained through one or more capacitors. The contactless card 600 may communicate back by switching a load on the contactless card's coil or load modulation. Load modulation may be detected in the terminal's coil through interference.

As explained above, the contactless card 600 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 7:
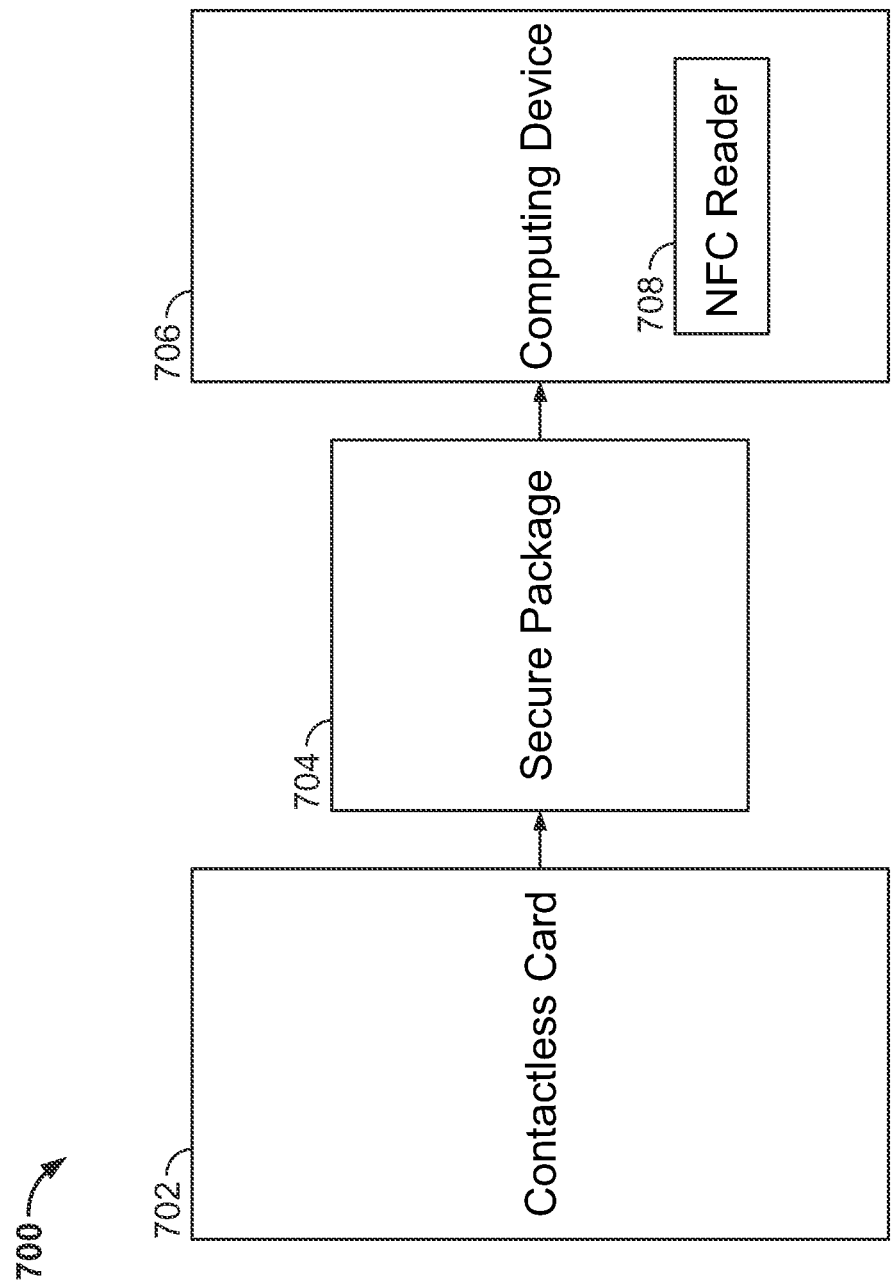
FIG. 7 shows a diagram of components illustrating interaction between the contactless card and the computing device.

FIG. 7 shows a diagram of components illustrating interaction between the contactless card 702 and the computing device 706. The contactless card may have NFC capabilities. When the contactless card gets in proximity to an NFC reader 708 on the mobile computing device 708, identity information in a secure package 704 is transferred to the computing device.

The generation of the secure package holding the identity information 704 may be generated cryptographic hash functions, such as MD5 or SHA-1. FIG. 8A shows a block diagram 800 depicting how the cryptographic hash functions may be used in exemplary embodiments. In the example shown in FIG. 8A, three inputs 802, 804 and 806 are passed through a hash function 808 together. The choice of depicting three inputs is intended to be illustrative and not limiting. Other number of inputs may be used in some instances. The hash function 808 produces an output hash value 812. Due to the nature of the hash function 808, it is computationally difficult to derive the inputs 802, 804 and 806 from the hash value 812 without knowing the key 810 used by the hash function 808. The key 810 is kept secret. The key 810 may be dynamically generated for each session and may be particular to the contactless card. Thus, the hash function 808 provides a layer of security for the content (e.g., inputs 802, 804 and 806) that is included in the secure package.

Figure 8B:
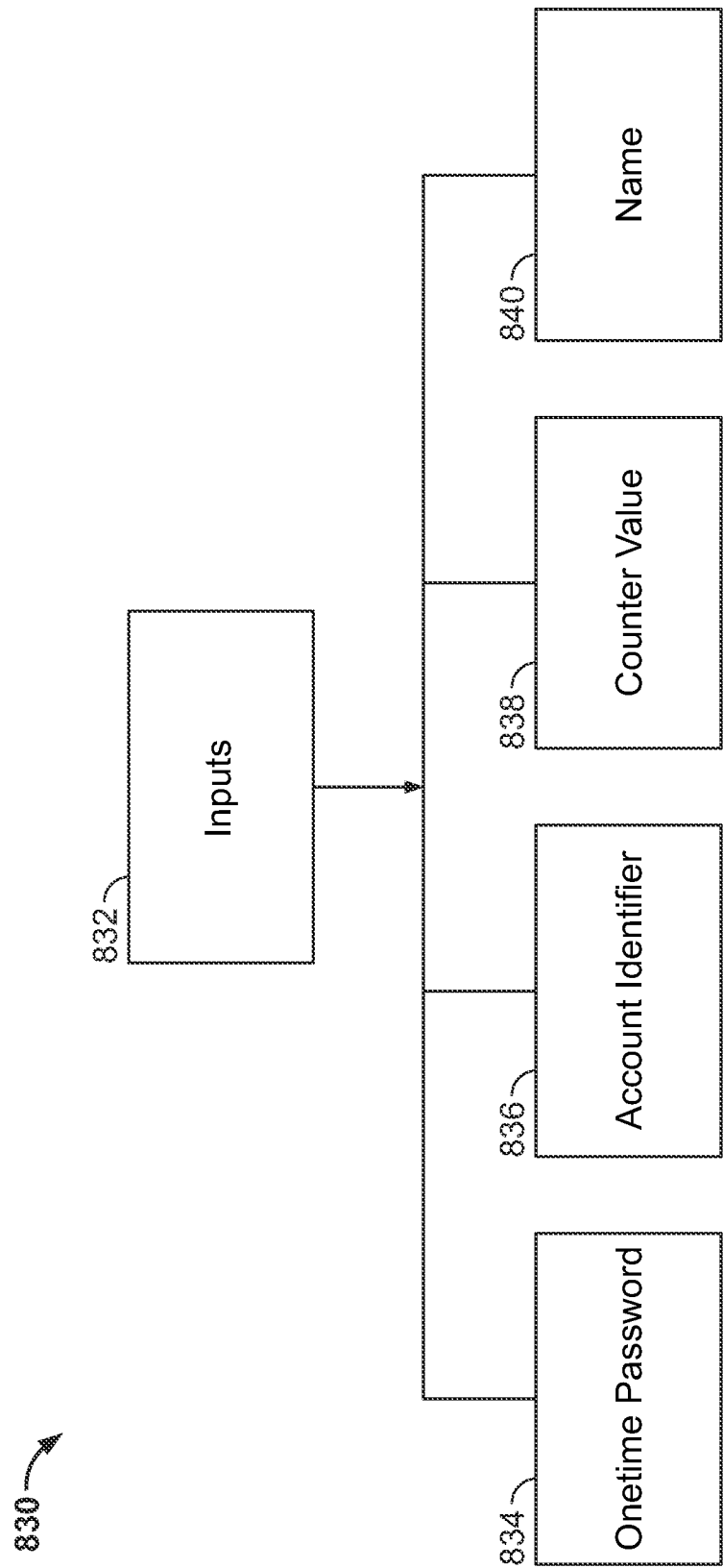
FIG. 8B, shows a diagram of possible types of inputs that may be hashed in exemplary embodiments.

In the exemplary embodiments, the inputs 802, 804 and 806 may vary depending on the information the parties wish to exchange and the protocol for authenticating the initiating party. FIG. 8B, shows a diagram 830 of possible types of inputs 832 that may be hashed in exemplary embodiments. In these exemplary embodiments, a onetime password 834 generated by the contactless card may be included as an input. An account identifier 836 for the initiating party may be provided. This may be an account number or other identifier that uniquely identifies the account of the initiating party. The account identifier 836 may be a phone number for the initiating party. In some cases, the phone number of the initiating party may not be included in the hash value 812 but may be derived from the message sent from the mobile computing device. The inputs 832 may include a counter value 838 and/or a name 840 of the initiating party.

As an added layer of security, the hash value 902 may be encrypted. FIG. 9 shows a block diagram 900 depicting such encryption. The hash value 902 generated as discussed above is passed to an encryption engine 904 that encrypts the hash value using an encryption key 906. The resulting output is the secure package 908. The encryption engine 704 may use any of a number of cryptographic algorithms, such as DES, AES, RSA, DSA or the like. These may be symmetric cryptographic algorithms like DES and AES or asymmetric cryptographic algorithms like RSA and DSA. It is presumed that the authentication service 432 possesses the appropriate key to decrypt the secure package. Although not shown in FIG. 9, other content may be encrypted in conjunction with the hash value 902.

Figure 10:
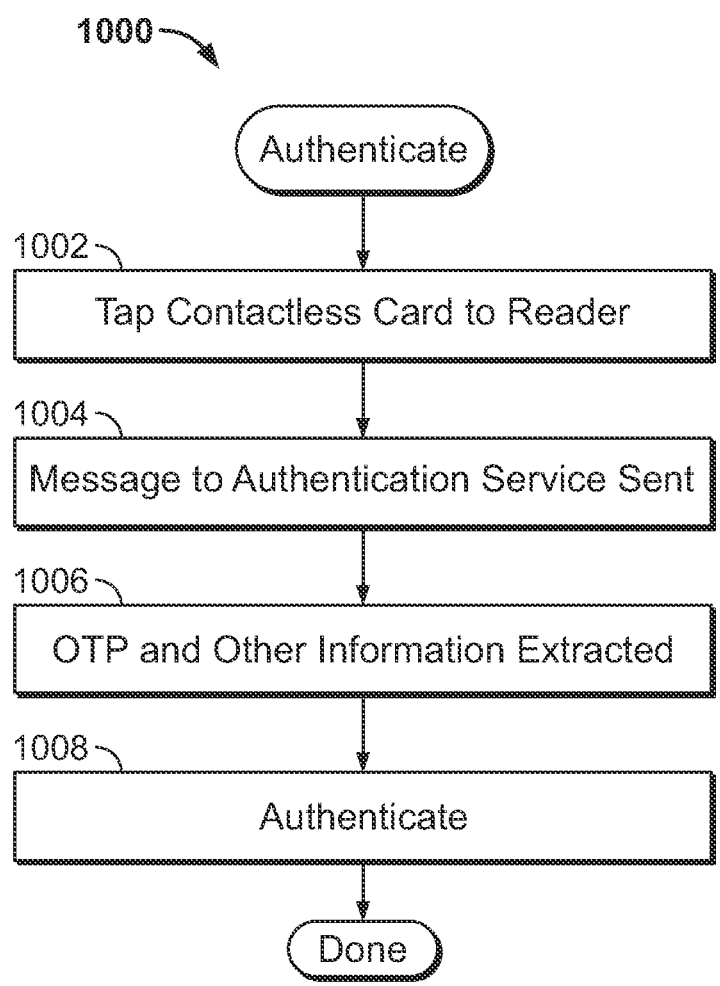
FIG. 10 provides a flowchart of illustrative steps that may be performed in authenticating the identity of a guest in exemplary embodiments.

FIG. 10 provides a flowchart 1000 of illustrative steps that may be performed in authenticating the identity of the user. The user taps the contactless card 702 to the mobile computing device 706, which has an NFC reader 708 as has been discussed above (see 1002). The mobile computing device 706 sends a message containing the secure package obtained from the contactless card 702 to the authentication service 432 on server 430 (see 1004). The onetime password (OTP) and other information in the secure package are extracted (see 1006). The authentication service 432 uses the extracted information to authenticate the identity of the user (see 1008).

Figure 11:
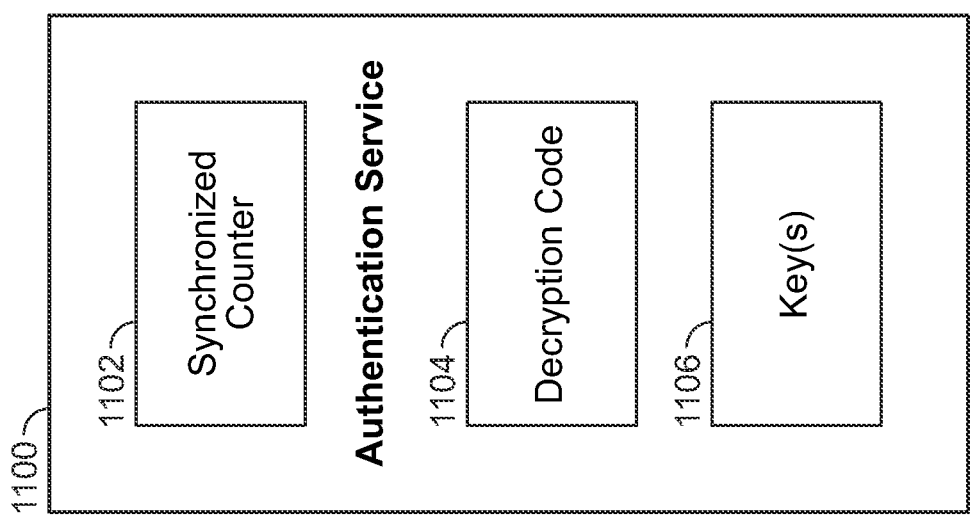
FIG. 11 depicts certain items stored as part of the authentication service in exemplary embodiments.

The discussion will not focus on the authentication service that receives the secure package that originated from the contactless card in more detail. FIG. 11 depicts certain items stored as part of the authentication service 1100. These items include a synchronized counter 1102 that may be used in decryption/encryption operations. The authentication service 1100 includes decryption code 1104 for performing decryption operations on the secure package. The authentication service 1100 may also store a number of decryption keys and encryption keys 1106.

Generally, the server 430 (or another computing device) and the contactless card 420 may be provisioned with the same master key (also referred to as a master symmetric key). More specifically, each contactless card 420 may be programmed with a distinct master key that has a corresponding pair in the authentication service 432. For example, when a contactless card 420 is manufactured, a unique master key may be programmed into the memory of the contactless card 420. Similarly, the unique master key may be stored in a record of a customer associated with the contactless card 420 in the account information accessible by the authentication service 432 (and/or stored in a different secure location). The master key may be kept secret from all parties other than the contactless card 432 and authentication service 432, thereby enhancing security of the system.

The master keys may be used in conjunction with the counters to enhance security using key diversification. The counters 415 and 1102 comprise values that are synchronized between the contactless card 420 and the authentication service 432. The counter value may comprise a number that changes each time data is exchanged between the contactless card 420 and the authentication service 432.

After communication has been established between mobile computing device 402 and the contactless card 420, the contactless card 420 may generate a message authentication code (MAC) cryptogram. In some examples, this may occur when the contactless card 420 is read. In particular, this may occur upon a read, such as an NFC read, of a near field data exchange (NDEF) tag, which may be created in accordance with the NFC Data Exchange Format. For example, a reader, such as the NFC reader, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 415 maintained by the contactless card 420 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 420 may then transmit the MAC cryptogram to the mobile computing device 402, which may then forward the MAC cryptogram to the authentication service 432 for verification as explained below. However, in some embodiments, the mobile computing device 402 may verify the MAC cryptogram.

More generally, when preparing to send data (e.g., to the server 430), the contactless card 420 may increment the counter 415. The contactless card 420 may then provide the master key and counter value as input to a cryptographic algorithm, which produces a diversified key as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC.

The contactless card 420 may then encrypt the data (e.g., the customer identifier and any other data) using the diversified key. The contactless card 420 may then transmit the encrypted data to the mobile computing device 402 (e.g., via an NFC connection, Bluetooth connection, etc.). The mobile computing device 402 may then transmit the encrypted data to the authentication service 432 on the server computing device 430 via the network 406. In at least one embodiment, the contactless card 420 transmits the counter value with the encrypted data. In such embodiments, the contactless card 420 may transmit an encrypted counter value, or an unencrypted counter value.

Although the counter is used as an example, other data may be used to secure communications between the contactless card 420, the mobile computing device 402, and/or the authentication service 432. For example, the counter may be replaced with a random nonce, generated each time a new diversified key is needed, the full value of a counter value sent from the contactless card 420 and the authentication service 432, a portion of a counter value sent from the contactless card 420 and the authentication service 432, a counter independently maintained by the contactless card 420 and the authentication service 432 but not sent between the two, a one-time-passcode exchanged between the contactless card 420 and the authentication service 432, and a cryptographic hash of data. In some examples, one or more portions of the diversified key may be used by the parties to create multiple diversified keys.

Figure 12:
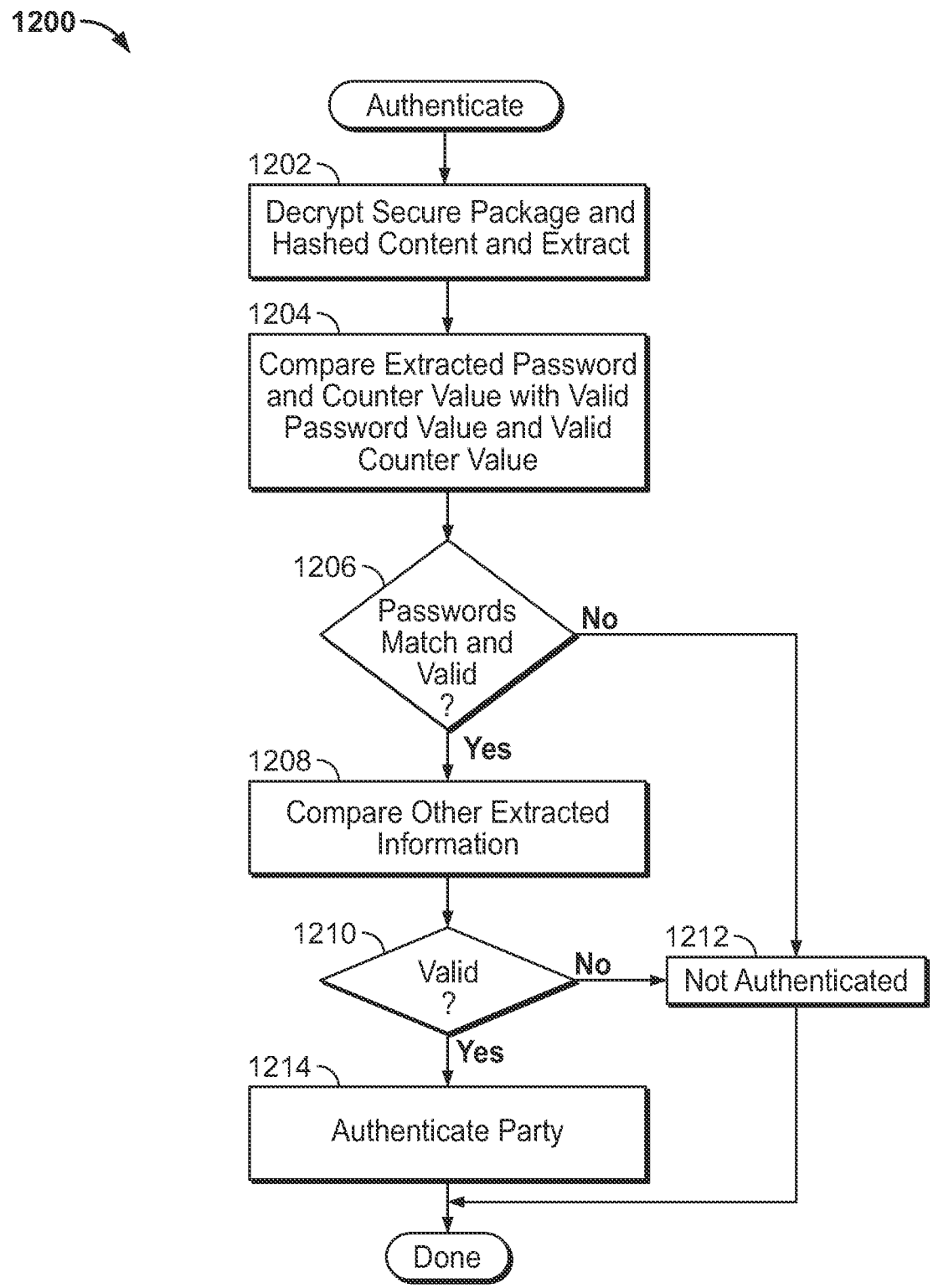
FIG. 12 depicts a flowchart of steps performed to authenticate the initiating party in exemplary embodiments.

FIG. 12 depicts a flowchart 1200 of steps performed to authenticate the initiating party once the authentication message with the secure package has been received by the authentication service 432 as the recipient party. Initially, the authentication service 432 uses the decryption keys 1106 to decrypt the secure package. In addition, the decryption keys 1106 are used to decrypt the hash to extract the inputs that were hashed together by the hash function 808 (see 1202). The extracted password and counter value may be compared with the valid password and valid counter value (see 1204). A determination is made whether the passwords match and the counter values match or if the extracted counter value otherwise indicates that the password has not expired (see 1206). If the passwords match and the extracted password has not expired based on the extracted counter value, other extracted information may be compared (see 1208).

The other information may be other authentication factors 1002 such as the phone number of the mobile computing device 402, which may be compared to the phone number on record for the user 418. The other authentication factors may include a geolocation for the user. The geolocation may be information such as GPS information or area code and exchange prefix information that may be compared with information regarding the residence of the user. The other authentication factors also may include a shared secret that is shared between the user and the authentication service 432.

With reference to FIG. 12 again, if the other information is valid (see 1210), then the user 418 is authenticated (see 1214). If not, the user 418 is not authenticated (see 1212). Similarly, if the passwords do not match or the password has expired as indicated by the extracted counter value, the user is not authenticated (see 1212).

Figure 13:
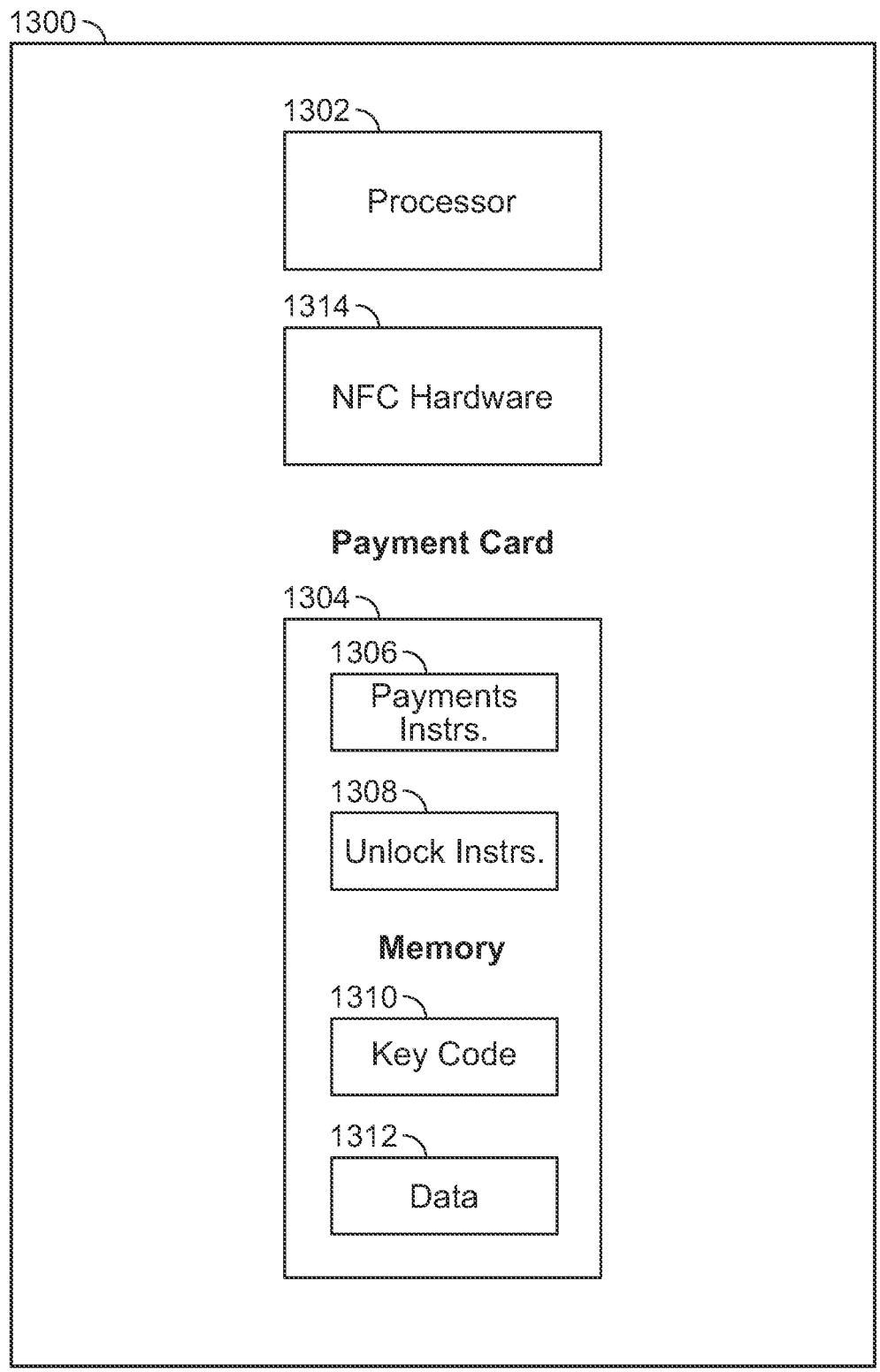
FIG. 13 depicts a block diagram of payment card suitable for us in exemplary embodiments.

The discussion will now focus on the payment card. FIG. 13 depicts a block diagram of payment card 1300 suitable for use in exemplary embodiments. The payment card 1300 may be a credit card, a debit card or other variety of card capable of being used for payments. The payment card 1300 may be a multifunction card, such as a smart card or contact card, in some embodiments. The payment card 1300 may include a processor 1302 for executing computer programming instructions and NFC hardware 1314 for providing NFC capabilities as described above. The payment card 1300 may also include memory 1304. The memory 1304 may store instructions 1306 for performing electronic payments with the payment card. The memory 1304 may also store instructions 1308 for unlocking a lock as described above. These instructions 1306 and 1308 may be executed by the processor 1302 to perform the functionality of the payment card 1300 described above. The memory 1304 may hold the key code 1310 that is used to unlock a lock, such as a lock on a door, a lock to an area, or a lock on an item. Lastly, the memory may store data 1312.

Figure 14:
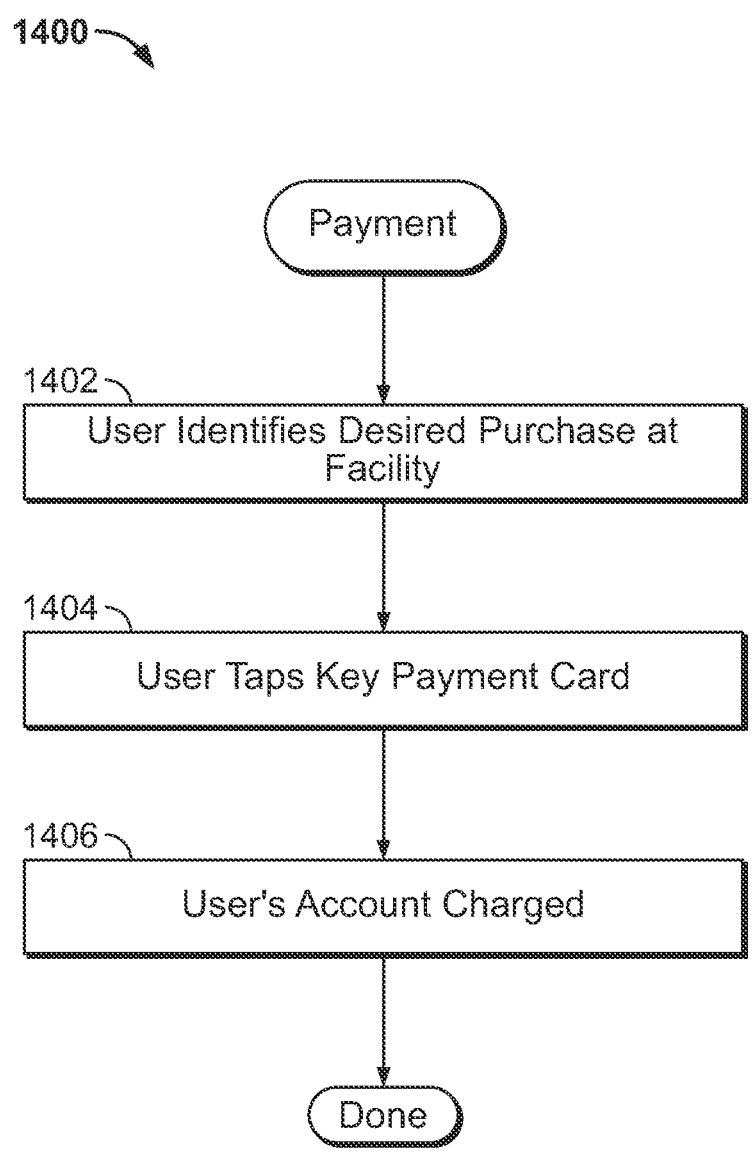
FIG. 14 depicts a flowchart of illustrative steps that may be performed to use the payment card for payments in exemplary embodiments.

FIG. 14 depicts a flowchart 1400 of illustrative steps that may be performed to use the payment card 1300 for payments, such as at a lodging, at an employment site, at a store, etc. First, a user identifies what the user wishes to purchase (see 1402). The user then taps the payment card to a reader to realize payment (see 1404). For example, a user in a user room may pay for items from a mini bar or pay for a movie by tapping payment card to a reader positioned within the user room. The reader may be an NFC reader that may wirelessly communicate via NFC with the payment card to realize the payment. As another example, an employee may have an identification card that is NFC capable and that may be used to unlock locks to secured areas at work. The employee may tap the identification card to an NFC reader at the lunchroom checkout to pay for lunch. The user account, such as a room account, employee account or bank account, is charged for the purchase (see 1406).

While the application has focused on exemplary embodiments, it should be appreciated that various changes in form and detail may be made without departing from the scope of the claims as appended hereto.

The invention claimed is:

1. A method, comprising:
  receiving, by a first server system, a request to perform an authentication operation to authenticate a user from a second server system, the second server system configured to perform check-in operations to access a space secured by a lock;
  receiving, by the first server system, from a computing device, encrypted data comprising a unique identifier and a counter value originating from a contactless card via a wireless communication protocol, wherein the encrypted data is generated by the contactless card based on the counter value maintained by the contactless card and encrypted with at least one diversified key and an encryption algorithm;
  determining, by the first server system, corresponding information for the contactless card stored by the first server system, the information comprising an authentic unique identifier for the user, a stored counter value for the contactless card, and one more additional diversified keys;
  decrypting, by the first server system, the encrypted data with the one or more additional diversified keys to extract the unique identifier and the counter value;
  verifying, by the first server system, the unique identifier and the counter value from the contactless card are valid based on the authentic unique identifier and the stored counter value; and
  sending, by the first server system, a response to the second server system, the response comprising an indication that the user is authenticated, the second server system is configured to generate a code to provide to the lock to access the space and send the code to the contactless card via the computing device, the contactless card configured to store the code and communicate the code to the lock to access the space.

2. The method of claim 1, wherein the contactless card is one of a smart card or a credit card with capabilities for the wireless communication protocol.

3. The method of claim 1, wherein the computing device and the contactless care configured to communicate via Near Field Communication (NFC).

4. The method of claim 1, wherein the first server system and the second server system are different systems maintained by different entities.

5. The method of claim 4, further comprising storing a room number for the code and storing an identity of a party onto the contactless card.

6. The method of claim 1, wherein the one or more diversified keys and the one or more additional diversified keys are generated from a master key.

7. A method, comprising:
providing a first application associated with a first server system, the first application and the first server system to provide check-in services to gain access to a space via a lock;
performing, by the first application, a check-in process comprising authenticating a user comprising:
communicating, by the first application, an exchange with a contactless card;
receiving, by the first application, encrypted data comprising a unique identifier and a counter value from the contactless card via wireless communications, wherein the encrypted data is encrypted by the contactless card with one or more diversified keys and an encryption algorithm; and
sending, by the first application, the encrypted data to a second server system, wherein the second server system is associated with the contactless card and configured to authenticate the encrypted data;
receiving, by the first application, a code from the first server system based on the encrypted data being authenticated by the second server system, the code serving as a digital key to unlock the lock to access the space; and
communicating, by the first application, a second exchange with the contactless card to send or write the code to the contactless card.

8. The method of claim 7, wherein the first application is executing on a portable computing device comprising one of a smartphone, tablet computing device, a smartwatch, a kiosk computing system, or a wearable device.

9. The method of claim 7, wherein the wireless communication is a Near Field Communication (NFC) communication.

10. The method of claim 7, wherein the first server system and the second server system are different systems maintained by different entities.

11. The method of claim 7, wherein the first application and the first server system are part of a hotel system, and the second server system is part of a banking system.

12. The method of claim 11, wherein the first server system is configured to with the second server system to perform at least a portion of the authenticating the user.

13. A contactless card, comprising:
communication hardware;
a memory configured to store:
a counter value configured to count based on each read operation performed by the contactless card;
identity information regarding a user;
computer program instructions configured to perform wireless payments and authentication operations;
computer program instructions configured to perform locking and unlocking functions;
a processor configured to execute the computer program instructions configured to perform the wireless payments and the authentication operations that cause the processor to:
detect a communication exchange with a computing device, the communication exchange comprising a request to perform an authentication operation;
generate encrypted data comprising the identity information to perform the authentication operation;
send the encrypted data to the computing device to perform the authentication operation;
the processor further configured to execute the computing program instructions configured to perform locking and unlocking functions that cause the processor to:
receive a key code for unlocking a lock in response to the authentication operation being successful;
store the key code in the memory; and
communicate, via the communication hardware, with a lock the key code to perform the locking and unlocking functions.

14. The contactless card of claim 13, wherein the communication hardware enables Near Field Communication (NFC) wireless communications, Bluetooth communications, or both.

15. The contactless card of claim 13, communicating the key code to the lock comprises sending the key code via a Near Field Communication (NFC) protocol or Bluetooth protocol.

16. The contactless card of claim 15, wherein the computer program instructions configured to perform wireless payments and authentication operations is comprised in a first JavaCard applet, and the computer program instructions configured to perform locking and unlocking functions is comprised in a second JavaCard applet.

17. The contactless card of claim 13, wherein the key code is receive from a mobile phone or a kiosk device.

* * * * *